(12) United States Patent
Böhnke

(10) Patent No.: US 10,391,426 B2
(45) Date of Patent: Aug. 27, 2019

(54) METHOD FOR MANUFACTURING A RECESS PLATE

(71) Applicant: OUTOTEC (FINLAND) OY, Espoo (FI)

(72) Inventor: Bernd Böhnke, Düsseldorf (DE)

(73) Assignee: OUTOTEC (FINLAND) OY, Espoo (FI)

(*) Notice: Subject to any disclaimer, the term of this patent is extended or adjusted under 35 U.S.C. 154(b) by 60 days.

(21) Appl. No.: 15/624,728

(22) Filed: Jun. 16, 2017

(65) Prior Publication Data
US 2017/0282098 A1 Oct. 5, 2017

Related U.S. Application Data

(63) Continuation of application No. PCT/EP2014/003455, filed on Dec. 22, 2014.

(51) Int. Cl.
*B01D 25/00* (2006.01)
*B01D 25/21* (2006.01)
(Continued)

(52) U.S. Cl.
CPC ........... *B01D 25/001* (2013.01); *B01D 25/12* (2013.01); *B01D 25/215* (2013.01);
(Continued)

(58) Field of Classification Search
CPC .... B01D 25/001; B01D 25/12; B01D 25/302; B01D 25/285; B01D 25/215; B01D 25/02; B01D 25/04; B01D 25/122; B29C 44/42; B29C 44/1228; B29C 70/42; B29L 2031/14; B29L 2007/002; B29K 2105/04; B29K 2309/08; B29K 2023/06
See application file for complete search history.

(56) References Cited

U.S. PATENT DOCUMENTS

| 4,617,214 A * | 10/1986 | Billarant | A44B 18/0076 24/306 |
| 5,800,588 A * | 9/1998 | Miller | B01D 46/0005 55/494 |
| 2001/0021428 A1* | 9/2001 | Simpson | B01D 25/215 428/36.5 |

FOREIGN PATENT DOCUMENTS

| CN | 101711179 A | 5/2010 |
| DE | 2134697 A1 | 1/1973 |

(Continued)

OTHER PUBLICATIONS

Machine Translation for Kniss, WO 9006797 A1 (Year: 1990).*
(Continued)

*Primary Examiner* — Christopher J Besler
*Assistant Examiner* — Christine Pellazar Bersabal
(74) *Attorney, Agent, or Firm* — Robert P. Michal, Esq.; Carter, DeLuca & Farrell LLP

(57) ABSTRACT

A recess plate designed for use in a filter device for filtering a suspension includes a stationary head piece and a movable end piece, and a pack including copies of the recess plate, having a filter chamber inside the pack, adjoining the recess plate, having a first pipe for filling the suspension into the filter chamber, having a filter cloth for collecting a solid content out of the suspension, and having a second pipe for discharging a liquid fraction of the suspension out of the filter chamber as a filtrate, wherein the filter device may be closed before filtering by forcing the end piece in direction of the head piece, and opened after filtering by releasing the end piece, and moving the end piece away from the head piece for removing the filter cake from the filter cloth.

13 Claims, 2 Drawing Sheets

Figure 1:
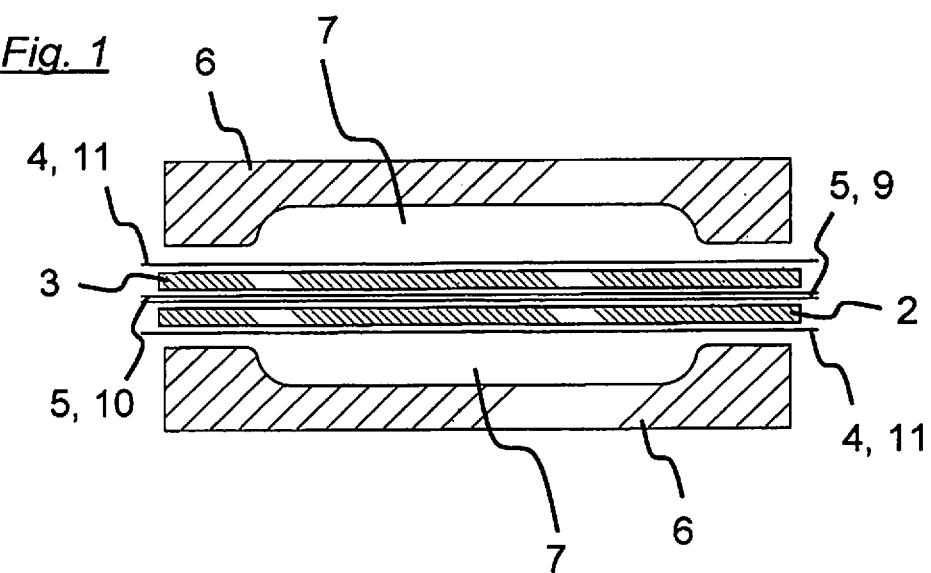

(51) Int. Cl.
  *B01D 25/28* (2006.01)
  *B01D 25/30* (2006.01)
  *B01D 25/12* (2006.01)
  *B29C 44/42* (2006.01)
  *B29C 70/42* (2006.01)
  *B29C 44/12* (2006.01)
  *B29K 105/04* (2006.01)
  *B29K 309/08* (2006.01)
  *B29L 7/00* (2006.01)
  *B29L 31/14* (2006.01)

(52) U.S. Cl.
  CPC ......... *B01D 25/285* (2013.01); *B01D 25/302* (2013.01); *B29C 44/42* (2013.01); *B29C 70/42* (2013.01); *B29K 2023/06* (2013.01); *B29K 2105/04* (2013.01); *B29K 2309/08* (2013.01); *B29L 2007/002* (2013.01); *B29L 2031/14* (2013.01)

(56) References Cited

FOREIGN PATENT DOCUMENTS

| DE | 3636792 A1 | 6/1987 | |
| DE | 102007027033 A1 * | 12/2008 | ........... B01D 25/215 |
| WO | WO-90/06797 A1 | 6/1990 | |
| WO | WO-9006797 A1 * | 6/1990 | ........... B01D 25/001 |
| WO | 2008148667 A1 | 12/2008 | |
| WO | WO-2013/139362 A1 | 9/2013 | |

OTHER PUBLICATIONS

Machine Translation for Bonn, DE 102007027033 A1 (Year: 2008).*
International Search Report issued by the European Patent Office acting as the International Searching Authority in relation to International Patent Application No. PCT/EP2014/003455 dated Aug. 19, 2015 (4 pages).
Written Opinion of the International Searching Authority issued by the European Patent Office acting as the International Searching Authority in relation to International Patent Application No. PCT/EP2014/003455 dated Aug. 19, 2017 (4 pages).
International Preliminary Report on Patentability issued by the European Patent Office acting as the International Preliminary Examining Authority in relation to International Patent Application No. PCT/EP2014/003455 dated Apr. 13, 2017 (6 pages).
Notification of the Second Office Action issued by the China National Intellectual Property Administration in relation to Chinese Application No. 201480084215.4 dated Jun. 20, 2019 (6 pages) along with English language translation (8 pages).

* cited by examiner

METHOD FOR MANUFACTURING A RECESS PLATE

CROSS-REFERENCE TO RELATED APPLICATION

This application is a Continuation of PCT Patent Application Serial No. PCT/EP2014/003455 filed Dec. 22, 2014 the disclosure of this application is expressly incorporated herein by reference in its entirety.

TECHNICAL FIELD

The invention relates to a method for manufacturing a recess plate to be used in a filter device for filtering a suspension, the filter device having a stationary head piece and a movable end piece, and a pack including copies of the recess plate, having a filter chamber inside the pack, adjoining the recess plate, having a first pipe for filling the suspension into the filter chamber, having a filter cloth for collecting a solid content out of the suspension, and having a second pipe for discharging a liquid fraction of the suspension out of the filter chamber as a filtrate, wherein the filter device may be closed before filtering by forcing the end piece in direction of the head piece, and opened after filtering by releasing the end piece, and moving the end piece away from the head piece for removing the filter cake from the filter cloth, wherein a first sheet is formed to provide a first surface of the recess plate at the filter chamber, and a second sheet is formed to provide a second surface of the recess plate vis-à-vis the first surface, a foam is injected into a spacing between the first sheet and the second sheet, and after hardening of the foam, the spacing is filled by a rigid body.

BACKGROUND ART

Recess plates are commonly known, inter alia from DE 10 2007 027 033 A1. Recess plates must be capable to take unavoidable differential pressure, and to return back to original shape after deflection due to differential pressures. They must take huge closing and sealing forces and full process pressures, without being compressed. Machining must be possible to ensure dimensional accuracy, and installing sealing rings and membranes. Fixing and supporting areas must be sufficiently strong, and they must provide opportunity to include internal channels for filtrate, washing media, air etc. These days, such recess plates are mostly molded from polypropylene (PP), or even from steel, and subsequently machined to the final shape.

Both the limited number of PP plate manufacturers and limited size of molding presses technically and economically constrains both manufacturing and application of filter devices.

US 2001/0021428 A1 suggests a method according to the above, wherein a shell including the first and second sheets is manufactured as one sealed hollow piece from rigid polyethylene by rotational moulding.

Problem to be Solved

It is an object of the invention to suggest an alternative recess plate.

SUMMARY OF INVENTION

Starting from the known method, the invention suggests that the first sheet and the second sheet are mounted to a frame, wherein the frame contains all drills and bores required for the filtrate, and the foam, together with the frame, forms the rigid body.

Using the recess plate according to the invention, both manufacturers and users of filter devices are no longer dependent on PP plate manufacturers, and on their limited manufacturing capacities, and limited size molding presses. The recess plate according to the invention provides very high strengths against differential pressures, low weight recess plates, fully automated manufacturing without need for huge and expensive presses, short manufacturing cycles.

In a favored method according to the invention, the sheet is from fabric. Fabric surfaces provide for high resistance against bending stress. Alternatively, the sheet may be a plastic film, or a steel panel.

In such method, the fabric is preferably reinforced by fibers. Resistance of the surface against bending stress is thus even increased.

Further in such method, the fibers are preferably fiber-glass. A huge variety of fiber-glass reinforced fabrics is commercially available, and processing the same is well known. Alternatively, the fibers may be e.g. carbon fibers, ceramic fibers, or metal fibers.

In such method, the recess plate having a sheet from fabric, the fabric is preferably penetrated with a hardening resin. Soaking with a hardening resin is well known for giving both dimensional stability and impermeability to a fabric. As an alternative to giving the fabric itself dimensional stability, a mold may be lined by a flexible fabric, and subsequently filled with hardening matter for forming the rigid body.

Further in such method, the resin preferably is polyethylene. Using polyethylene (PE) for impregnating fabrics is well known, and PE is a highly competitive material, for this purpose.

In a favored method according to the invention, the first surface and/or the second surface are formed by pressing the respective first sheet and/or second sheet to a solid mold. Forming the sheet in a reusable solid mold provides for reproducible shapes and large-scale production.

In such method, a protective sheet is preferably arranged between the respective first sheet and/or the second sheet and the solid mold, and removed from the first surface and/or the second surface, after forming. Such protective sheets may be used to avoid soiling of both the mold, and of the pressing agent with resin from the first and/or second sheets.

Preferably, in a method according to the invention, the first surface and the second surface are formed by arranging the first sheet and the second sheet between two solid molds, and inserting a pressing agent between the first sheet and the second sheet. Simultaneously forming both surfaces allows for streamlining the manufacturing process of the recess plate, and avoiding warehousing. Alternatively, only one sheet may be formed between a solid mold an a solid lid, closing the recess, or two independent sheets may be formed by combining two independent solid molds.

In a further favored method according to the invention, a fluid is used for pressing the first sheet and/or the second sheet to the solid mold. A fluid always adapts to, and thus in independent of the shape of the solid mold. Alternatively, a male mold (or "positive mold") may be used for pressing the sheets to the mold. Such male mold may be either rigid, or flexible.

In such method, the fluid preferably is hot water. Hot water may assist in hardening the resin soaking the sheets.

Further preferred, in a method according to the invention, the rigid body is glued to at least one of the first sheet and the second sheet. Gluing provides for a durable connection of the rigid body to the sheet(s).

BEST MODE FOR CARRYING OUT THE INVENTION

The recess plate manufactured according to the invention and the associated method are subsequently described in more detail with reference to the drawing figures, showing schematic cuts through the sheets, molds, and the resulting recess plate during four steps in the manufacturing process.

In manufacturing a recess plate 1 according to the invention, as shown in FIG. 1, a stack of two sheets 2, 3 from glass-fiber reinforced fabric, soaked with liquid PE, each lined by two protective sheets 4, 5—here: plastic foils—is inserted between two female solid molds 6.

Figure 2:
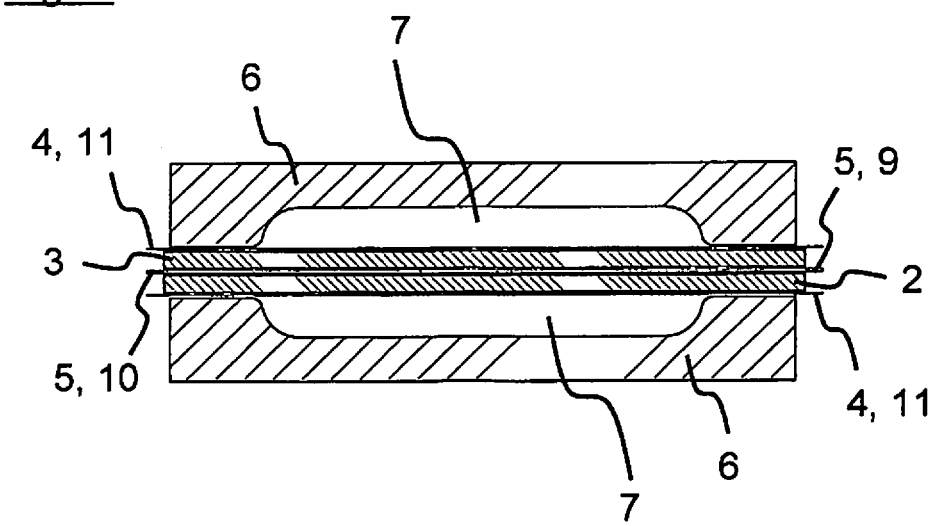

The solid molds 6 are then pressed, and clamped (clamps not shown) together, to ensure sealing of the recesses 7 inside, as shown in FIG. 2.

Figure 3:
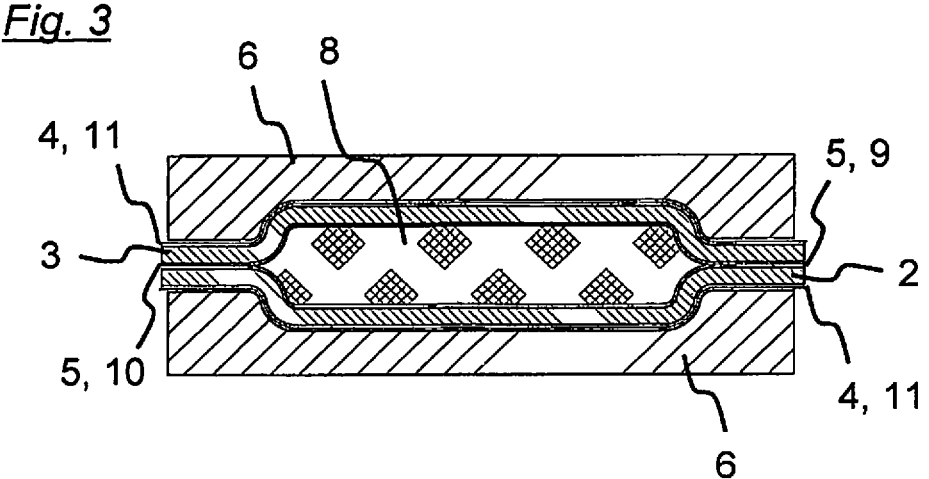

As shown in FIG. 3, hot water 8 is then fed between the two sheets 2, 3, pressing the same into the recesses 7. After hardening of the PE, the hot water 8 is discharged, the solid molds 6 are opened. Until now, the first surface 9 of the first sheet 2 and the second surface 10 of the second sheet 3 are facing each other.

Figure 4:
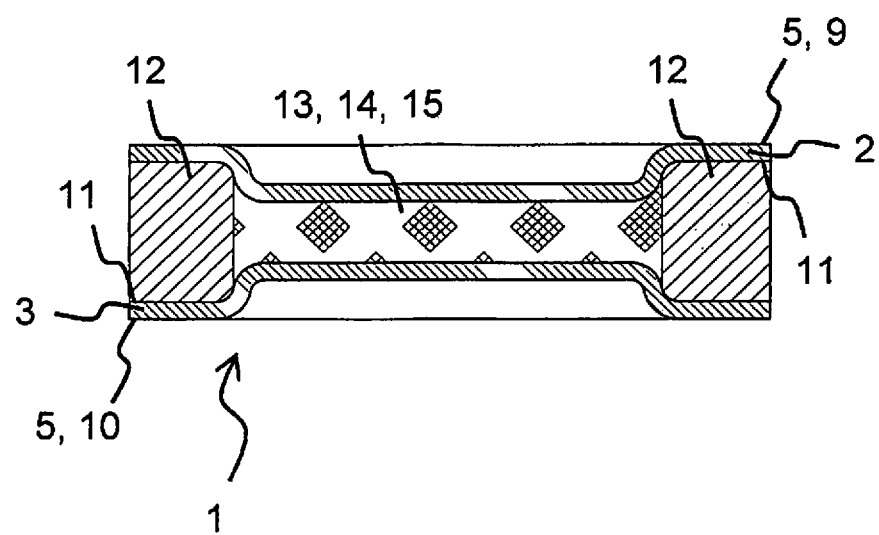

The sheets 2, 3, now having the shape of the respective recesses 7, and being dimensionally stable, are removed from the solid molds 6. The protective sheets 4 are removed from the flip sides 11 of the sheets 2, 3, and, as shown in FIG. 4, and the sheets 2, 3 reversed to have the flip sides 11 of the sheets 2, 3 facing each other. The sheets 2, 3 are mounted to a prepared frame 12, containing all the drills and bores required for filtrate, wash water, air etc. Then the hollow space 13 between the sheets 2, 3 is filled with a structural foam 14 core material using a SAN polymer base featuring high toughness and impact resistant characteristics, e.g. available under the trade name Corecell™ M from Gurit Holding AG, Wattwil/Switzerland. After hardening, together with the frame 12, the foam 14 forms the rigid body 15 of the recess plate 1.

The protective sheets 5 remain on the first surface 9 and on the second surface 10, until delivery.

In the figures are
1 recess plate
2 first sheet
3 second sheet
4 protective sheet
5 protective sheet
6 solid mold
7 recess
8 water
9 first surface
10 second surface
11 flip side
12 frame
13 hollow space
14 foam
15 rigid body

The invention claimed is:

1. A method for manufacturing a recess plate to be used in a filter device for filtering a suspension, the filter device having a stationary head piece and a movable end piece, and a pack including copies of the recess plate, having a filter chamber inside the pack, adjoining the recess plate, having a first pipe for filling the suspension into the filter chamber, having a filter cloth for collecting a solid content out of the suspension, and having a second pipe for discharging a liquid fraction of the suspension out of the filter chamber as a filtrate, wherein the filter device may be closed before filtering by forcing the end piece in direction of the head piece, and opened after filtering by releasing the end piece, and moving the end piece away from the head piece for removing the filter cake from the filter cloth, wherein
   a. a first sheet is formed to provide a first surface of the recess plate at the filter chamber, and a second sheet is formed to provide a second surface of the recess plate vis-à-vis the first surface,
   b. reversing at least one of the first or second sheets to arrange a first flip side of the first sheet to face a second flip side of the second sheet,
   c. the first sheet and the second sheet are mounted to a frame to form a spacing between the first sheet and the second sheet,
   d. a foam is injected into the spacing between the first sheet and the second sheet, and
   e. after hardening of the foam, the foam, together with the frame, forms a rigid body.

2. The method according to claim 1, wherein the first sheet and the second sheet are from fabric.

3. The method according to claim 2, wherein the fabric is reinforced by fibers.

4. The method according to claim 3, wherein the fibers are fiber-glass.

5. The method according to claim 2, wherein the fabric is penetrated with a hardening resin.

6. The method according to claim 5, wherein the resin is polyethylene.

7. The method according to claim 1, wherein the first surface and/or the second surface are formed by pressing the respective first sheet and/or second sheet to a solid mold.

8. The method according to claim 1, wherein a protective sheet is arranged between the respective first sheet and/or the second sheet and the solid mold, and removed from the first surface and/or the second surface, after forming.

9. The method according to claim 7, wherein the first surface and the second surface are formed by arranging the first sheet and the second sheet between two solid molds, and inserting a pressing agent between the first sheet and the second sheet.

10. The method according to claim 7, wherein a fluid is used for pressing the first sheet and/or the second sheet to the solid mold.

11. The method according to claim 10, wherein the fluid is hot water.

12. The method according to claim 1, wherein the rigid body is glued to at least one of the first sheet or the second sheet.

13. The method according to claim 9, wherein the first flip side of the first sheet and the second flip side of the second sheet face away from one another when the first sheet and the second sheet are arranged between the two solid molds, and the first flip side of the first sheet and the second flip side of the second sheet face one another when the first sheet and the second sheet are mounted to the frame.

* * * * *